(12) United States Patent
Sohi et al.

(10) Patent No.: US 12,386,533 B2
(45) Date of Patent: Aug. 12, 2025

(54) COMPUTER SYSTEM WITH INSTRUCTION PRE-SENDING

(71) Applicant: Wisconsin Alumni Research Foundation, Madison, WI (US)

(72) Inventors: Gurindar Sohi, Madison, WI (US); Shyam Murthy, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 31 days.

(21) Appl. No.: 18/311,589

(22) Filed: May 3, 2023

(65) Prior Publication Data
US 2024/0370191 A1 Nov. 7, 2024

(51) Int. Cl.
*G06F 3/06* (2006.01)

(52) U.S. Cl.
CPC ............ *G06F 3/064* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,577,217 A | 11/1996 | Hoyt et al. | |
| 6,560,693 B1 * | 5/2003 | Puzak | G06F 9/30047 712/240 |
| 8,719,806 B2 * | 5/2014 | Wang | G06F 9/3842 717/149 |
| 9,280,351 B2 | 3/2016 | Bonanno et al. | |
| 9,690,707 B2 | 6/2017 | Chou | |
| 10,042,776 B2 | 8/2018 | Saidi et al. | |
| 10,642,618 B1 * | 5/2020 | Hakewill | G06F 12/0862 |
| 2017/0090935 A1 | 3/2017 | Falsafi et al. | |
| 2017/0286116 A1 * | 10/2017 | Johar | G06F 9/30054 |
| 2019/0394214 A1 | 12/2019 | Ahuja et al. | |
| 2020/0285477 A1 * | 9/2020 | Winrow | G06F 9/3846 |
| 2022/0050715 A1 | 2/2022 | Shear et al. | |
| 2022/0245054 A1 * | 8/2022 | Jada | G06F 11/3688 |
| 2022/0365836 A1 | 11/2022 | Cheriton | |
| 2023/0023860 A1 | 1/2023 | Holman et al. | |

FOREIGN PATENT DOCUMENTS

| | | |
|---|---|---|
| KR | 20190044565 A | 4/2019 |
| KR | 20190106271 A | 9/2019 |
| WO | 2018142140 A1 | 8/2018 |

(Continued)

OTHER PUBLICATIONS

Reinman et al., Fetch Directed Instruction Prefetching, Nov. 1999.
(Continued)

*Primary Examiner* — Stephanie Wu
(74) *Attorney, Agent, or Firm* — Boyle Fredrickson, SC

(57) ABSTRACT

A computer architecture provides a pre-sending of memory blocks from a lower level memory hierarchy component to a higher level memory hierarchy component using a table linking a set of memory blocks holding instructions that are executed in different fragments of a program. The table is used to pre-send memory blocks to the higher level memory hierarchy component in anticipation of their use by a processor executing the program.

27 Claims, 4 Drawing Sheets

(56) References Cited

FOREIGN PATENT DOCUMENTS

| WO | 2019162647 A1 | 8/2019 |
|----|---------------|--------|
| WO | 2021263156 A1 | 12/2021 |

OTHER PUBLICATIONS

Bonanno et al., Two Level Bulk Preload Branch Prediction, 2013.
Diga et al., The IBM z15 High Frequency Mainframe Branch Predictor, 2020.
Ros et al., The Entangling Instruction Prefetcher, IEEE Computer Architecture Letters, vol. 19, No. 2, Jul.-Dec. 2020.
Ferdman et al., Temporal Instruction Fetch Streaming, 2008.
Kolli et al., RDIP: Return-address-stack Directed Instruction Prefetching.
Ferdman et al., Proactive Instruction Fetch, 2011.
Burcea et al., Predictor Virtualization, 2008.
Chen et al., Instruction Prefetching Using Branch Prediction Information, EECS Department, University of Michigan, 1997.
Aamodt et al., Hardware Support for Prescient Instruction Prefetch.
Zhang et al., Execution History Guided Instruction Prefetching, 2002.
Kaynak et al., Confluence: Unified Instruction Supply for Scale-Out Servers, 2015.
Annavaram et al., Call Graph Prefetching for Database Applications, Electrical Engineering and Computer Science Department, The University of Michigan, Ann Arbor, 2001.
Srinivasam et al., Branch History Guided Instruction Prefetching, 2001.
Kumar et al., Boomerang: a Metadata-Free Architecture for Control Flow Delivery, Institute of Computing Systems Architecture, University of Edinburgh, 2017.
Kumar et al., Blasting Through The Front-End Bottleneck With Shotgun, Associate for Computing Machinery, 2018.
Ayers et al., AsmDB: Understanding and Mitigating Front-End Stalls in Warehouse-Scale Computers, 2019.
Ros et al., A Cost-Effective Entangling Prefetcher for Instructions, Computer Engineering Department, University of Murcia, 2021.
International Search Report for PCT/US2024/025654 dated Aug. 14, 2024.

\* cited by examiner

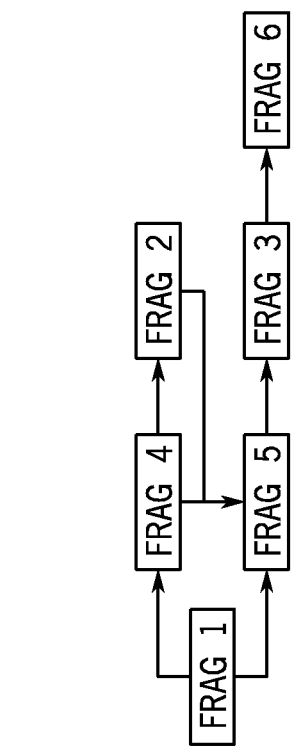

COMPUTER SYSTEM WITH INSTRUCTION PRE-SENDING

STATEMENT REGARDING FEDERALLY SPONSORED RESEARCH OR DEVELOPMENT

—

CROSS REFERENCE TO RELATED APPLICATION

—

BACKGROUND OF THE INVENTION

The present invention relates to computer architectures employing a memory hierarchy and, in particular, to a system for pre-sending blocks of memory from the lower levels of the memory hierarchy to the higher levels of the memory hierarchy in such architectures.

Modern computer systems may employ a hierarchical memory having at a lowest level a disk drive and then a large main memory, typically comprised of many gigabytes to terabytes of dynamic random access memory (DRAM), and at higher levels, successively smaller cache memories, for example, having kilobytes to megabytes of static random access memory (SRAM). The smallest and fastest cache, closest to the processor, is normally designated L1 and there may be multiple lower-level caches of increasing size and typically decreasing speed (e.g., L2, L3) leading to the main memory. There may also be storage buffers to hold blocks of memory separate from the caches.

The smaller caches are more closely integrated with the processor to provide increasingly faster processor access. Smaller caches, however, also require more frequent "fetching" of blocks of memory from lower-level caches.

The timely fetching of instructions by a processor is critical to a processor's performance and energy efficiency and for this reason a variety of systems have been proposed to prefetch blocks of memory, ("memory blocks,") from lower levels of a memory hierarchy into the higher levels of the memory hierarchy. For example, memory blocks of the size of cache blocks holding program instructions are prefetched from a L2 cache into a L1 instruction cache in anticipation of use by a processor. Basic forms of prefetching may simply fetch the next address-sequential block of program instructions, while more sophisticated prefetching systems may attempt to track a likely path of program execution and thereby identify future relevant memory blocks.

Currently proposed sophisticated prefetching techniques require intimate knowledge of processor microarchitecture events (e.g., branch prediction, return address stack activity, instruction cache misses, or the number or timing of these events) and thus can be difficult or costly to implement and can also be less efficient.

SUMMARY

The present invention provides a system for pre-sending memory blocks to the higher levels of the memory hierarchy without the need for accurate and time-precise knowledge of processor micro-architectural events. Instead a high-level representation of memory block usage of a program is constructed and used to identify and pre-send memory blocks likely to be needed by the processor in the future based on memory blocks that are currently accessed. Preliminary studies suggest that this approach significantly decreases latencies in comparison to more tightly coupled prefetching approaches of greater complexity.

More specifically, in one embodiment the invention provides a computer architecture having a processor and a memory hierarchy providing a lower level component and a higher level component providing faster access by the processor than the lower level component, the lower level component holding a portion of a program in defined memory blocks. An instruction pre-sending unit communicates with the processor and the lower level component and operates during execution of a program by the processor to: (1) maintain a table linking a first instruction of the program to a first set of memory blocks and to a second instruction of the program, the second instruction linked to a second set of memory blocks and succeeding the first instruction in an execution of the program; and (2) use the table to pre-send a memory block from the first set of memory blocks and from the second set of memory blocks from a lower level component of the memory hierarchy to a higher level component of the memory hierarchy.

It is thus a feature of at least one embodiment of the invention to permit a pre-sending of memory blocks arbitrarily ahead of the processor's sequencing through the program and thus potentially much faster than pre-fetching. The pre-sending is guided by a table providing a coarse model of the program requiring only sufficient detail to identify memory blocks for pre-sending. In this regard, the present inventors have determined improved processing speed can be obtained with relatively compact and achievable table sizes.

The memory blocks in the first set of memory blocks and second set of memory blocks may be cache blocks.

It is thus a feature of at least one embodiment of the invention to provide a system useful for the important case of cache updating.

The first and second sets of memory blocks may be defined by corresponding portions of the program delineated by call instructions or return instructions of the program.

It is thus a feature of at least one embodiment of the invention to provide a simple and compact representation of program flow described by calls and returns.

In some cases, the table may link a given first instruction and first set of memory blocks to two or more second instructions and second sets of memory blocks.

It is thus a feature of at least one embodiment of the invention to accommodate multiple paths of program execution in the table.

The table may assign path aging bits to each of the two or more second instructions and second sets of memory blocks and the pre-sending unit may operate to pre-send a memory block from a given second set of memory blocks based upon the value of the path aging bits.

It is thus a feature of at least one embodiment of the invention to select among multiple paths yet unresolved by the processor, for the purpose of pre-sending, by favoring recently used paths.

Alternatively or in addition, the instruction pre-sending unit may operate to pre-send a memory block from each of the corresponding two or more second sets of memory blocks from the lower level component to the higher level component.

It is thus a feature of at least one embodiment of the invention to permit pre-sending along two different alternative paths to accommodate path uncertainty.

The instruction pre-sending unit may determine whether a memory block from the given set of memory blocks is currently in the higher level component and pre-send the memory block to the higher level component based on that determination.

It is thus a feature of at least one embodiment of the invention to improve the efficiency of pre-sending by determining in advance that the data may already have been sent.

The instruction pre-sending unit may further repeat the pre-sending process of (2) with the first instruction associated with the first set of memory blocks in a given repetition being the second instruction associated with the second set of memory blocks of the previous repetition.

It is thus a feature of at least one embodiment of the invention to allow the pre-sending to extend arbitrarily ahead of current execution by repetition.

The instruction pre-sending unit may perform at least two repetitions without communication with the processor.

It is thus a feature of at least one embodiment of the invention to provide a method of anticipating memory block need that is largely decoupled from the processor, simplifying the architecture, reducing processor burden, and permitting pre-sending much in advance of processor execution.

In some cases, the instruction pre-sending unit may periodically receive from the processor an identifier of currently executing memory blocks to control the number of repetitions.

It is thus a feature of at least one embodiment of the invention to permit limiting advanced pre-sending to manage pre-sending errors that can increase as the pre-sending moves further ahead from current processing The instruction pre-sending unit may maintain the table by monitoring historical execution cycles of the program.

It is thus a feature of at least one embodiment of the invention to allow the table to be automatically developed during program execution.

The first instruction of the program and second instruction of the program in the table may be identified by a compressed representation of the program counter values of the first instruction of the program and of the second instruction of the program.

It is thus a feature of at least one embodiment of the invention to provide a simple method of indexing the table, through the use of instruction program counter values, while minimizing the table size.

These particular objects and advantages may apply to only some embodiments falling within the claims and thus do not define the scope of the invention.

BRIEF DESCRIPTION OF THE DRAWINGS

FIG. 3 is a logical representation of a graph of the order of execution of the program fragments of the program of FIG. 2;

FIG. 4 is a logical representation of a portion of a fragment table used and maintained by the instruction pre-sending unit of FIG. 1;

DETAILED DESCRIPTION

Figure 1:
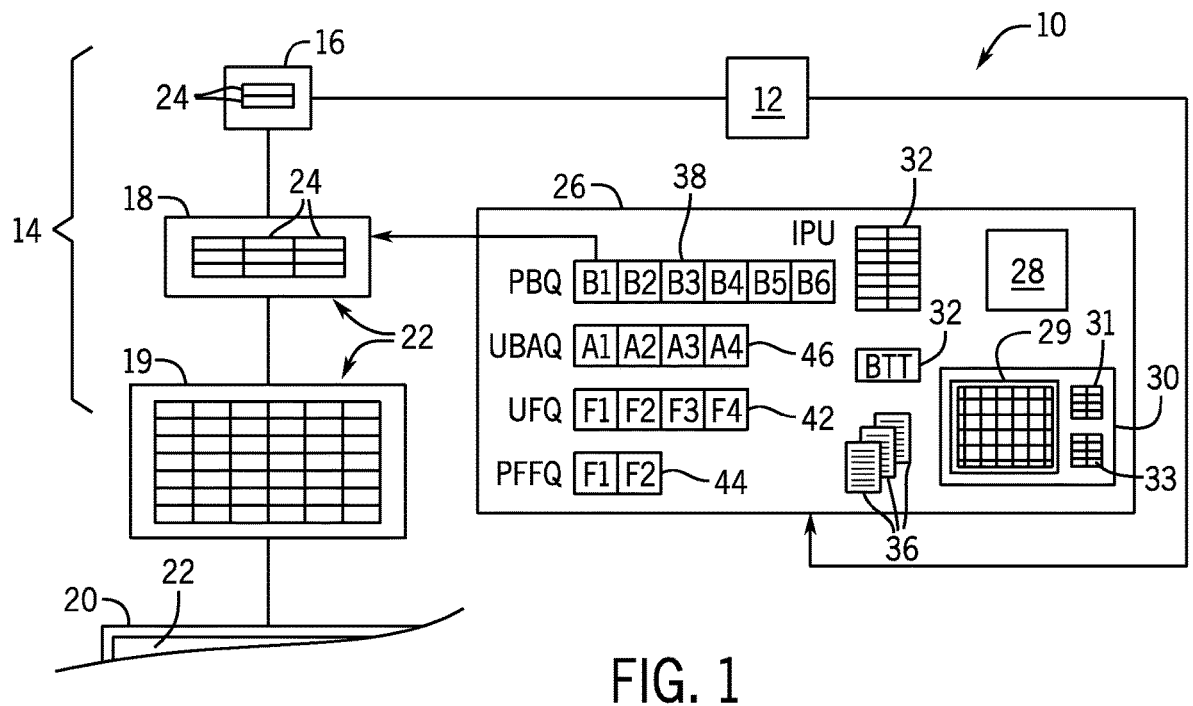
FIG. 1 is a block diagram of a computer architecture incorporating the instruction pre-sending unit of the present invention.

Referring now to FIG. 1, a computer architecture 10 constructed according to the teachings of the present invention may provide a processor 12, for example, capable of out-of-order, speculative execution and prefetching and communicating with a memory hierarchy 14. In this non-limiting example, the memory hierarchy 14 includes an L1 cache 16, an L2 cache 18, and L3 cache 19, and a main memory 20.

As discussed above, the L1 cache 16 will be closely coupled to the processor 12 for high-speed access, for example, using static random access memory (SRAM) and will be smaller than the L2 cache 18 which may communicate indirectly with the processor 12 through the L1 cache 16 and will also typically be SRAM. The L2 cache 18 may communicate either directly or through additional cache layers like the L3 cache 19 with the much larger main memory 20, for example, the latter typically constructed of dynamic random access memory and being on the order of more than 1000 times larger than the L2 cache 16. The main memory 20 will hold an executable program 22 portions of which may be replicated as cache blocks 24 (more generally memory blocks) in the other caches or in other storage elements in the memory hierarchy.

One embodiment described below describes the pre-sending of memory blocks holding instructions from a L2 cache 18 to an L1 cache 16, in anticipation of need by the processor 12, however the invention contemplates use, more generally, in sending memory blocks from an arbitrary lower-level components to higher-level components of a memory hierarchy.

The processor 12 and the L2 cache 18 may further communicate with an instruction pre-sending unit (IPU 26) which operates to anticipate memory blocks holding instructions required by the processor 12 and to preemptively move those memory blocks from the L2 cache 18 to the L1 cache 16 in a pre-send operation. Generally, the IPU 26 will include a logic unit 28 performing a set of steps as will be described below, making use of a number of data structures including: a fragment table (FT 30), a shadow cache 32, a block temperature table (BTT 34), multiple IPU stacks (IPU stacks 36), a pre-send block queue (PBQ 38), an upcoming block address queue (UBAQ 40), an upcoming fragments queue (UFQ 42), and a processor fragment fetched queue (PFFQ 44), the latter communicating with the processor 12. The FT 30, for reasons of storage efficiency, may include a main table 29 and a smaller overflow region table (ORT 31) and a dual target table (DTT 33). Each of these data structures and their use will be described below in more detail.

Figure 2:
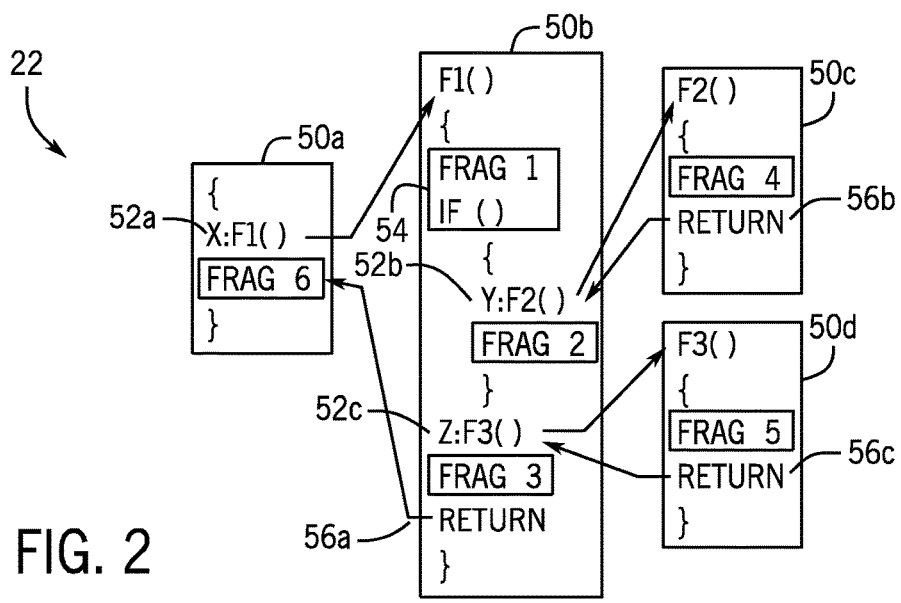
FIG. 2 is a graphical representation of a sample program used to describe the present invention having multiple call and return instructions defining program fragments.

Referring now to FIG. 2, an example program 22 may provide for a set of program snippets 50a-50d interconnected by call instructions 52 and return instructions 56.

In this example, the first snippet 50a may provide for a call instruction 52a X:F1( ) where X indicates a program counter value of the call instruction 52a and F1( ) is a function call for function F1 at that program counter value. This function call is followed by a program fragment (fragment 6) being a set of program instructions that are processed when the program control returns from processing function F1.

Snippet 50b is the function F1( ) and includes a first fragment (fragment 1) followed by a conditional branch 54 if ( ), the latter conditional branch 54 which includes a second function call instruction 52b Y:F2( ) followed by a second fragment (fragment 2). The snippet 50b then continues with a third function call instruction 52c Z:F3( ) followed by a third fragment (fragment 3) and terminated with a return instruction 56a causing a return of the program execution to fragment 6, which is the program fragment following the function call instruction 52a in snippet 50a.

Snippet 50c is the function F2( ) and includes a fragment (fragment 4) and a return instruction 56b. Likewise snippet 50d is the function F3( ) and includes a fragment (fragment 5) followed by a return instruction 56c.

Referring now to FIG. 3, this program can be expressed in a graph 58 form where each of the fragments form a graph node interconnected by directed edges indicating program execution order. In this graph 58, fragment 1 may be followed by fragment 4 or fragment 5 depending on the result of the conditional branch 54. Fragment 4 is always followed by fragment 2, fragment 2 is always followed by fragment 5, fragment 5 is always followed by fragment 3, and fragment 3 is always followed by fragment 6.

Referring now to FIG. 4, the example program 22 of FIG. 2 is captured in a main table 29 of a fragment table (FT) 30 which may identify the fragments (fragment 1-fragment 6) by means of a program counter value of the processor 12 at a call instruction 52 and stored in column 60 of the main table 29 of the FT 30. For each identifier 60, the FT 30 maintains information for a call (call) fragment, and a return (return) fragment. The call fragment is the fragment that is executed as a result of the call instruction 52 at the program counter value associated with the identifier 60. For example, the call fragment for the call instruction 52a X:F1( ) at program counter value X, is fragment 1. The return (return) fragment is the fragment that will be executed when the program execution returns after the execution of the call instruction 52 associated with the identifier 60. For example, the return fragment for the call instruction 52a X:F1( ) at program counter value X, is fragment 6.

A call fragment is linked to the memory blocks holding the instructions of that fragment, these memory blocks are recorded in column 62. More specifically column 62 of the main table 29 will hold the block address of a first memory block for that fragment and a number of contiguous memory blocks thereafter. For example, column 62 may hold <B12, 2> indicating an initial memory block B12 and a total of two memory blocks to also include memory block B13, a structure intended to reduce the size of the FT 30 in a common case where memory blocks of a fragment are contiguous. The next column 64 of the main table 29 holds memory blocks associated with the return fragment also using the same format.

The next two columns 66 and 68 of the main table 29 identify the next fragment where the program execution will proceed after the current call and return fragments, respectively. If the current fragment is terminated by a call instruction, the next fragment is identified by the program counter value of the call instruction 52. If the current fragment is terminated by a return instruction 56, the next fragment is simply identified as a return (return), as the identifier of the fragment that will be executed next is not known without further information processing.

Columns 70 and 72 of the main table 29 provide instruction counts for the call fragment and the return fragments, respectively, and will be used to determine how far in advance the pre-sending process of the IPU 26 should proceed ahead of the current execution of the processor 12 as will be discussed.

The final four columns 74a-74b of the main table 29 maintain information (which may be a single bit for each column) that will refer to other tables (the ORT 31 and DTT 33) of the FT 30 which are used to supplement the columns described above when the memory blocks of a particular fragment are not contiguous or where there are multiple possible next fragments and as such serve simply to reduce the storage requirements of the FT 30.

Referring momentarily to FIG. 1, the logic unit 28 of the IPU 26 operates to both maintain the FT 30 to build a logical graph representation of the historical operation of the program 22 and to use the FT 30 to pre-send memory blocks from the L2 cache to the L1 cache. Operation of the logic unit 28 to maintain the FT 30 will now be described in reference to the program 22 of FIGS. 2 and 3 and with reference to FIG. 5. Generally, this updating creates a record of the use of memory blocks by the processor 12 and thus require some communication from the processor 12 indicating its current execution. However, an entry in the FT 30 may not need to be updated often once it has been created.

Figure 5:
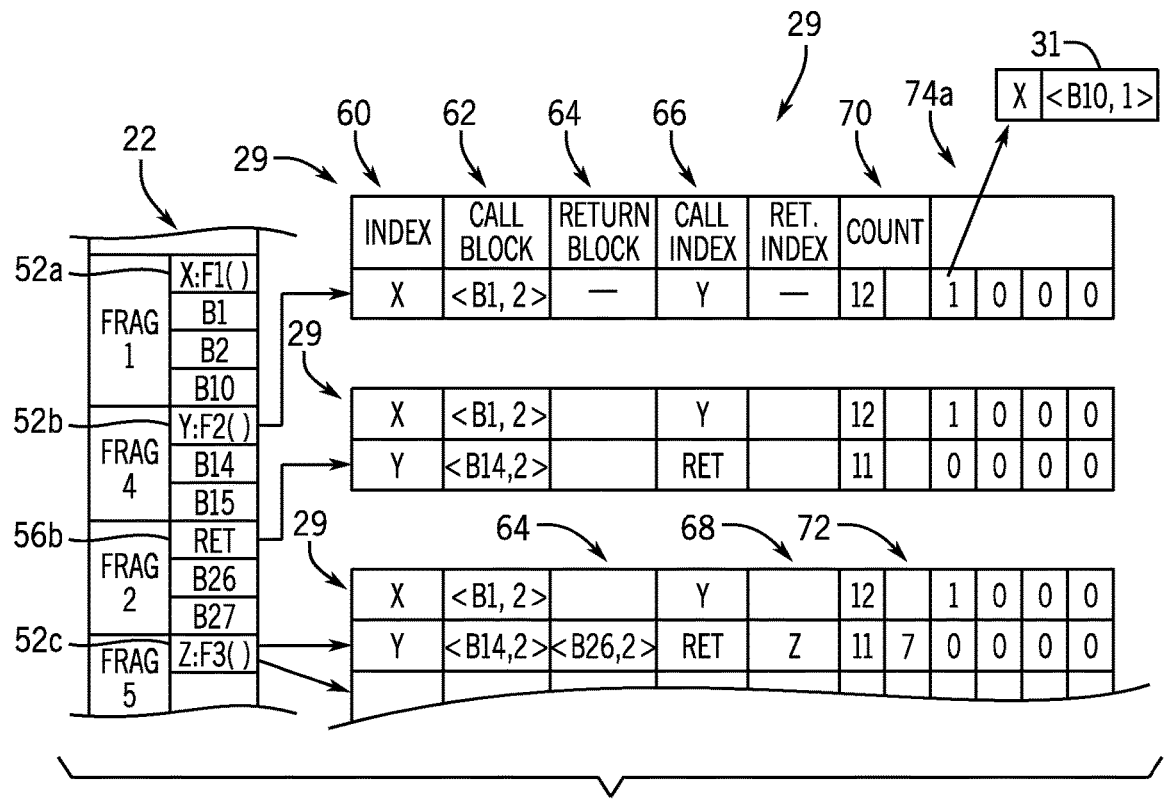
FIG. 5 is sequence diagram showing construction of a portion of the fragment table of FIG. 4 (also including an ancillary overflow region table and a dual target table) as populated from the sample program of FIG. 2; per one embodiment of the invention.

Referring specifically to FIGS. 2 and 5, when the processor 12 encounters a first call instruction 52, which starts a given fragment, it records the program counter value of the first call instruction and starts to track the memory blocks that hold the instructions that it processes. The processor 12 also counts the number of instructions that it is processing since the first call instruction. When the processor 12 encounters a second call instruction 52 or a return instruction 56, which end the given fragment, it recognizes a fragment. It then sends to the IPU 26 the program counter value of the first call instruction, which serves as the identifier of the given fragment, the set of memory blocks in the given fragment, and the identifier of the instruction that ended the given fragment which then serves as the identifier of the next fragment that will be executed after the given fragment. If the given fragment was ended by a second call instruction, it sends the program counter value of the second call instruction as its identifier. If the given fragment was ended by a return instruction, it sends a value indicating a return instruction.

For example, when the call instruction 52a is the first call instruction encountered, the processor 12 will count the number of instructions until it reaches the second call instruction 52b (assuming that the conditional branch 54 is true) upon which it recognizes fragment 1. The processor 12 then sends to the IPU 26 the program counter value X (based on the program counter value of the first call instruction 52a identifying fragment 1) and the set of memory blocks (B1, B2, B10) comprising the fragment 1, as well as the program counter value Y of the instruction that ended fragment 1 (e.g. call instruction 52b).

In response, the IPU 26 will create an entry in the main table 29 of the FT 30 for a call fragment corresponding to the fragment identifier X. The FT 30 may be treated as a cache, as is ordinarily understood in the art. Some bits of the fragment identifier X may be used as an index into the FT 30, and some bits may be used to represent the identifier in column 60.

The IPU 26 may also record the memory blocks accessed in the fragment 1, being B1 and B2, in column 62 of the main table 29 in a compressed form as <B1,2> indicating that two consecutive blocks starting with B1 were accessed. In this case, because the blocks used by fragment 1 are not contiguous (e.g., B1, B2, and B10) they all cannot be stored in the compressed form of column 62 of the main table 29 which requires contiguous blocks, and thus block B10 is stored in the ORT 31. This expanded storage is indicated by a set bit in the overflow column for the current call fragment at column 74*a* of the main table 29 and indicates the existence of an entry in ORT 31 indexed with program counter value X recording the additional noncontiguous block B10.

As assumed above, when the conditional branch instruction 54 of fragment 1 (If( ) is true, and the call instruction 52*b*, Y:F2( ) at program counter value Y is encountered, it is this call instruction 52*b* that has terminated fragment 1, and Y is the identifier of the next fragment that will be processed after fragment 1. Accordingly, Y is recorded in column 66 of the FT 30 entry. Further, the total number of instructions of fragment 1, a value of 12 in this example, may be recorded at column 70.

At this time, the memory blocks of column 64 for the return (return) fragment, fragment 6 in this example, are not yet known nor its instruction count nor its next fragment. These items will be populated later as will be discussed.

When the processor 12 reports the return instruction 56*b* representing the end of fragment 4, the main table 29 of the FT 30 may be updated by entering a new row for fragment 4 indexed by the program counter value Y of the call instruction 52*b* Y:F2( ) which terminated the previous fragment (fragment 1) and started the new fragment (fragment 4). The row in the main table 29 may be updated providing it blocks <B14,2> (indicating blocks B14 and B15) in column 64, and indicating that this fragment 4 was terminated by a return (placing RET in column 66) and a count of the number of instructions (11) in column 70. The IPU 26 may then use the value RET to determine the precise identifier of the next fragment as will be discussed. The blocks for this fragment are contiguous and hence an entry in ORT 31 is not required, leaving the bit in column 74*a* unset.

After the processing of the return instruction 56*b*, which matches the call instruction 52*b* Y:F2( ) the processor 12 may then begin to execute fragment 2, which is the return (return) fragment of the call instruction 52*b*. When the processor 12 reaches call instruction 52*c* Z:F3( ) indicating the end of fragment 2 and the start of fragment 5, the processor 12 conveys information for fragment 2 to the IPU 26. The IPU 26 may update the entry for the return fragment (indexed at Y) in the main table 29 of FT 30 with the memory block addresses for the return fragment (fragment 2) at column 64 (<B26,2>), with the identifier for next fragment 5 (Z) at column 68, and the number of instructions in fragment 2 (7) at column 72. The row in the main table 29 of FT 30 for fragment identifier X remains incomplete at this time because there has been no return from the call instruction 52*a*, and thus the return fragment for that row has not been identified. But ultimately this table row is completed when return instruction 56*a* is processed and fragment 6 is encountered and identified, as was the case when fragment 2 was identified as the return fragment for identifier Y above.

Figure 6:
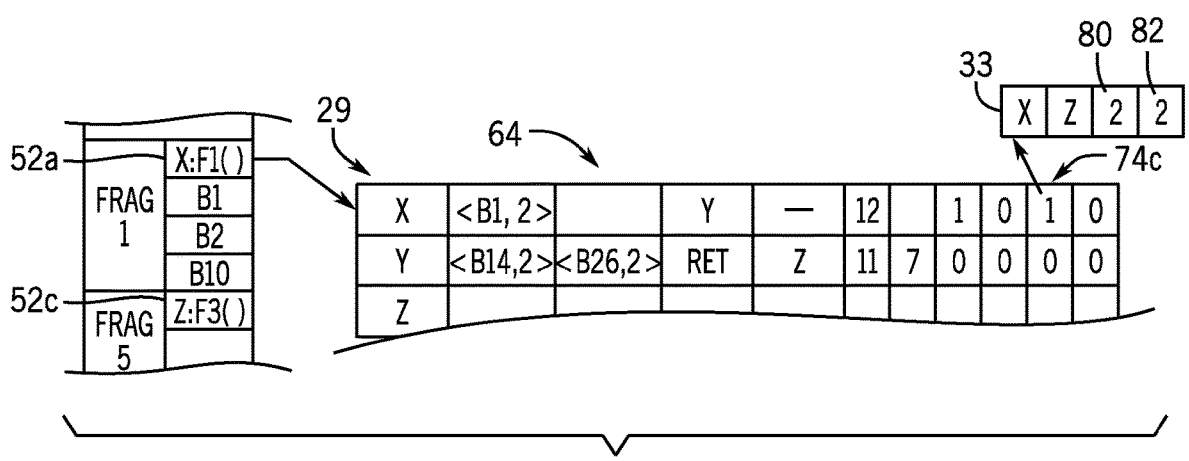
FIG. 6 is a sequence diagram showing further inputting to the fragment table of FIG. 4 from a later execution of the sample program of FIG. 2 following a different program path.

Referring now to FIG. 6, at a subsequent execution cycle of the program 22, fragment 1 may again be executed but the program 22 may not take the conditional branch 54 leading to call instruction 52*b* of program counter value Y. In this case, the program 22 proceeds to call instruction 52*c*. Referring briefly to FIG. 3, this is the transition from fragment 1 to fragment 5 as opposed to the previous transition from fragment 1 to fragment 4 and then to fragment 2 and to fragment 5 and indicates that there are two potential subsequent fragments to fragment 1. As will be discussed, the processor 12 communicates to the IPU 26 the call instructions 52 and return instructions 56 that it is executing via the PFFQ 44. The IPU 26 may compare the sequence of call and return instructions from the processor 12 in the PFFQ 44 with its own sequence in the UFQ 42 to recognize a difference indicating a new path in the execution of the program and also to learn the identifier of the next fragment on this new path of execution.

Referring to FIGS. 2 and 3, when the processor 12 is proceeding from fragment 1 to fragment 4, it will convey the sequence of call instruction 52*a* followed by call instruction 52*b* and then return instruction 56*b* to the IPU 26 via the PFFQ 44. If instead the IPU 26 observes a sequence of call instruction 52*a* followed by call instruction 52*c* in the PFFQ 44, it recognizes a different path of execution following fragment 1 and the next fragment on this new path is identified by the program counter value Z of the call instruction 52*c* which followed the call instruction 52*a* in the PFFQ 44.

Returning to FIG. 6, this new path of execution is recorded in the FT 30 for row X to show that there are two different paths that are possible from fragment 1, one to fragment 4 (identified by the identifier Y) and the other to fragment 5 (identified by the identifier Z). As column 66 of the main table 29 is already occupied with identifier of fragment 4 (Y), a DTT 33 is used to record this new succeeding fragment 5 as flagged by a bit in column 74*c* of the main table 29. The DTT 33 provides an entry having an index X linking it to the entry of the main table 29 and records the program counter value Z serving as an identifier for fragment 2 already contained in the main table 29 of the FT 30. The entry of the DTT 33 may also include a pair of path aging bits 80 and 82 whose values reflect a likelihood of each of the two different paths possible from fragment 1 (fragment 4 or fragment 5) and will be used later in some embodiments of the invention. It will be appreciated that the DTT 33 can be expanded to provide for multiple alternative next fragments for a particular fragment corresponding to multiple different paths possible from the given fragment. Generally both DTT 33 and ORT 31 are simply logical extensions of the main table 29 of the FT 30 serving to save table space because not every entry will require this additional data.

The above process may be repeated to provide a full mapping of the graph 58 of FIG. 3 over time.

The processor 12 may communicate to the IPU 26 the memory blocks that it has accessed to maintain the FT 30 only if one of those memory blocks experienced a miss in the L1 cache 16. In this manner, the communication from the processor 12 to the IPU 26 to maintain entries in the FT 30 may be reduced as the entries in the FT 30 need not be updated in the frequent case of hits in the L1 cache 16.

Figure 7:
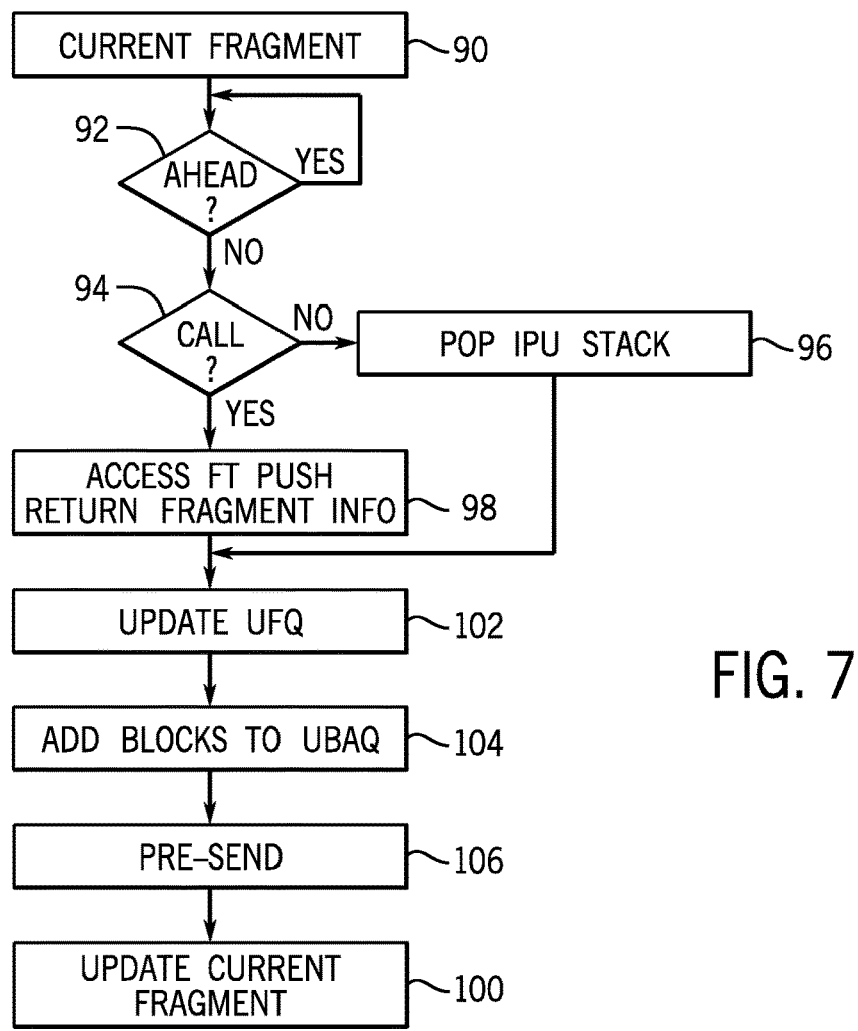
FIG. 7 is a flow chart of the operation steps performed by the instruction pre-sending unit of FIG. 1 in using the fragment table of FIG. 4.

As noted above, the logic unit 28 of the IPU 26 operates not only to maintain the FT 30 as described, but also to use the FT 30 to pre-send memory blocks from the L2 cache 18 to the L1 cache 16. Referring now to FIG. 7, as indicated by process block 90, a current fragment may be identified by the IPU 26 for processing, for example, by communication of a starting fragment from the processor 12 via the PFFQ 44 indicating a current program counter value. At later times during operation of the IPU 26 this current fragment may be a fragment that is the next fragment identified in a FT 30 entry as will be discussed.

The IPU 26 may operate much in advance of the processor execution, for example, to be more than one fragment ahead of the fragment currently being executed by the processor 12. How far ahead the IPU 26 is in execution with respect to the processor 12 is assessed at decision block 92, which compares a current tally of the instructions of columns 70 and 72 of memory blocks that have been pre-sent by the IPU 26 to the L1 cache 16 to the last reporting by the processor 12 of its program counter value. Desirably, the IPU 26 operates within a range ahead of the processor 12 that ensures the L1 cache 16 is timely loaded but not so far ahead as to cause the loading of memory blocks of successive fragments to displace other memory blocks in the L1 cache 16 that will be used sooner or to incur significant errors in this process. It will be appreciated that this instruction count value may be alternatively a time value. If the IPU 26 is sufficiently ahead of the processor, it simply loops at decision block 92 until the next reporting of a program counter value from the processor 12 indicates that additional pre-sending is needed.

If at decision block 92 the IPU 26 is not sufficiently far ahead of the processor 12, and if the current fragment identifier of process block 90 is not that of a return (return), the fragment identifier is used to index the FT 30 to access the information for the call fragment for that identifier. Further, the information for the return fragment for that identifier accessed from the FT 30 may be pushed on an IPU stack 36 per process block 98.

If the current fragment identifier is a return (return), as determined at process block 94, the information for the fragment is not accessed from the FT 30. Rather this information popped from the IPU stack 36 as indicated by process block 96, where it was pushed as per process block 98 during the processing of a preceding fragment by the IPU 26.

At process block 102, the UFQ 42 is updated with the current fragment identifier and will be used by the IPU 26 to synchronize with the processor 12 as will be discussed.

At process block 104 IPU 26 uses the information for the current fragment, obtained from either the FT 30 or the IPU stack 36 as above, to obtain the necessary addresses of the memory blocks in the set of memory blocks in the fragment and put them into the UBAQ queue 40. At this time, the UBAQ 40 may also be examined to see if it is likely that the enrolled memory blocks may already be in the L1 cache 16. This may be done by referring to a shadow cache 32 maintained by the IPU 26 which may be updated by monitoring the UBAQ 40 (which indicates the addresses of memory blocks sent from the L2 cache 18 to the L1 cache 16) thus eliminating the need to actively poll the L1 cache 16.

At process block 104, the entries of the UBAQ 40 may also be examined to see if it is likely that the represented memory blocks are "cold," that is, touched by the processor 12 at some point but rarely used after that. This aspect may be tracked using the temperature bits in a BTT 34, for example, in one embodiment, having three bits for each block address in the L2 cache 18. The block addresses may be compressed, for example, by truncation or by hashing or by another method to better manage the size of the BTT 34. Such a compression may result in an aliasing of the block addresses with a plurality of block addresses associated with the same BTT 34 entry.

The bits of an entry in the BTT 34 may be set to a high-value (e.g., seven) when a memory block corresponding to the BTT entry is sent to the L1 cache 16. The L1 cache 16 may be then equipped with an access bit which is reset when the L1 cache 16 receives the memory block and set if that memory block is accessed before being evicted from the L1 cache 16. If a block is evicted from the L1 cache 16 with its access bit reset, the temperature bit in the corresponding BTT 34 may be decremented. Only memory blocks in the UBAQ 40 with a predetermined threshold of temperature may be sent to the L1 cache 16 in one embodiment.

At process block 106, those elected blocks from UBAQ 40 are loaded into the PBQ 38 from the L2 cache 18 and scheduled to be sent to the L1 cache 16.

Referring still to FIG. 7, the next fragment identifier of the current fragment is then used to update the current fragment identifier, per process block 100, and the IPU 26 returns to process block 90 to continue the process of pre-sending memory blocks. In this way the IPU 26 can repeatedly pre-send memory blocks with the current fragment identifier of a given repetition being the next fragment identifier of the previous repetition Referring now to FIG. 6, a fragment may have more than one next fragment. In this case, the IPU 26 needs to make a decision on which next fragment to use as the fragment to continue the pre-sending process. In one embodiment multiple, different IPU stacks 36 may be used to continue the process along multiple paths. Each path may be given its own IPU stack 36, and the process of FIG. 7 is performed for each path. Experimental results suggest that proceeding down multiple paths may be advantageous in some cases.

In one embodiment memory blocks from both paths (for example, fragment 4 and fragment 5 of graph 58 of FIG. 3 when the starting fragment is fragment 1) may be sent from the L2 cache 18 to the L1 cache 16 with the knowledge that blocks from one path may not be used by the processor 12. In another embodiment, the path aging bits 80 and 82 discussed above may be employed to select between the two possible (or multiple possible) paths, by comparing the values of the path aging bits 80 and 82 and selecting the path associated with a larger value and send memory blocks from the L2 cache 18 to the L1 cache 16 only for the selected path. In another embodiment, memory blocks from a given path may be sent from the L2 cache 18 to the L1 cache 16 if the value of its path aging bits exceeds a threshold. The updating of the path aging bits 80 and 82 for this purpose will be described below.

Synchronization

Figure 8:
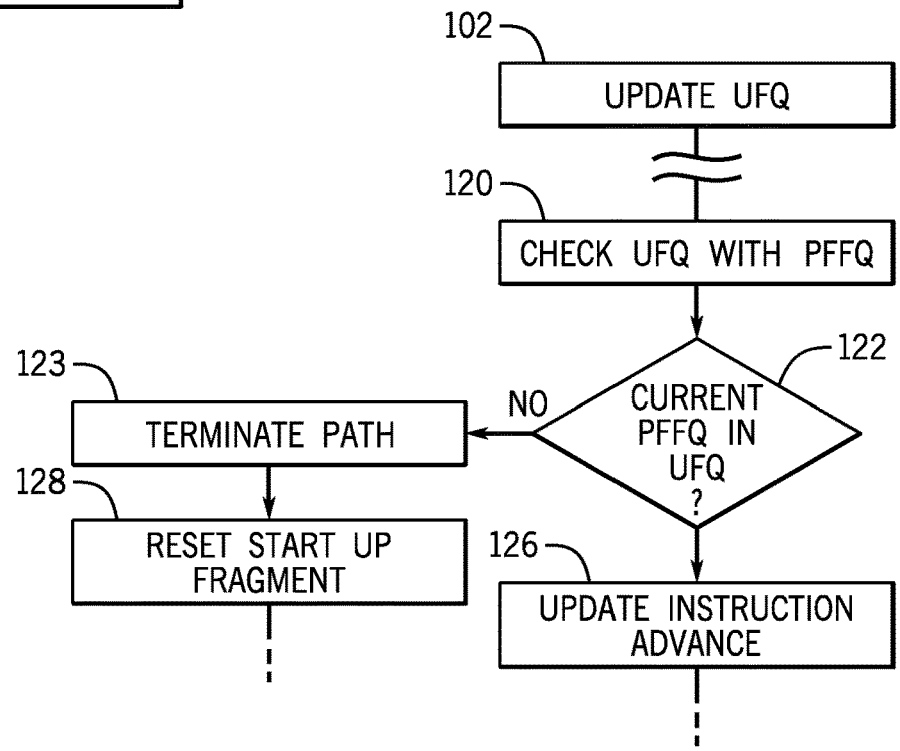
FIG. 8 is a flowchart of a synchronization process synchronizing the instruction pre-sending unit with the processor of FIG. 1.

Referring now to FIG. 8, the processor 12 communicating with the IPU 26 populates a PFFQ 44 by periodically reporting call instructions and return instructions which define fragments being executed. At block 120 executed by the IPU 26, the entries in the PFFQ 44 are compared to the entries in the UFQ 42. At decision block 122 if the fragment at the head of the PFFQ 44 is found in the UFQ 42, the indication is that the IPU 26 is proceeding on the same path at the processor 12 and the cumulative instruction count of the succeeding blocks in the UFQ 42 may be used in process block 126 to update how far ahead of the processor the IPU 26 is and to provide input to the decision block 92 of FIG. 7. If on the other hand, the latest value of the PFFQ 44 is not found in the UFQ 42, a divergence between the path being pursued by the processor 12 and the IPU 26 is detected, and the IPU 26 terminates proceeding down the path for which there is a mismatch, as per process block 123. The IPU 26 then uses the value at the head of the PFFQ 44 as the identifier of a starting fragment at process block 90 of FIG. 7 to restart the pre-sending process per process block 128. Additionally, in process block 123, the IPU stack 36 may be adjusted (for example by updating the stack pointers) and the number of instructions used at decision block 92 may be reset to zero.

At process block 123, this comparison process may also be used to terminate any multiple paths being processed using the multiple IPU stacks 36 (related to multiple next fragments recorded in the FT 30) by resolving which of the multiple paths is actually being executed. At the same time the value of the path aging bits 80 and 82 may be adjusted positively for the correct path and negatively for an incorrect path.

Fragment Table Set Associativity

The FT 30 may be organized as a set associative table. In this case, when a row is first created in FT 30, the FT 30 is accessed set associatively to determine an entry in the FT 30 for the fragment. The associativity helps to reduce the number of conflicts among different fragments. However, when the IPU 26 accesses the FT 30, it uses the next fragment identifier of column 68, not some arbitrary fragment identifier, to access the FT 30. If the next fragment identifier in an FT 30 entry is maintained as an index into the FT 30, most of the accesses of the FT 30 by the IPU 26 can be direct and need not be done in a set associative manner. This can increase the speed and reduce the energy of the access of the FT 30 by the IPU 26. Likewise, accesses to the DTT 33 and ORT 31 can also be made directly rather than set associatively, as they merely maintain additional information for a fragment in the FT.

Indirect Calls With Multiple Targets

For direct calls in the program 22, there is a unique fragment associated with the call, and thus the program counter value of the call instruction is an adequate fragment identifier for column 60 of the FT 30. However, for indirect calls, there could be multiple targets of the call instruction. To distinguish between the different targets/fragments, a hash of the program counter value of the call instruction and the program counter value of the target instruction may be used as a fragment identifier.

Loops and Recursion

Loops and recursion are program constructs where the same set of fragments are executed repeatedly, and eventually execution proceeds to the fragment at the continuation of the loop or the recursive call. The IPU 26 need not send the memory blocks of fragments with the loop/recursion repeatedly as they will likely already be in the L1 cache 16 after the first time they are sent. After the loop/recursion exit, the IPU 26 should be sufficiently ahead of the processor 12 to avoid misses on the continuation path. To achieve this, at a loop/recursion the IPU 26 may proceed along two paths, one along the looping/recursion path which can be of an indeterminate length, and the other along the continuation path following the loop or recursion. Along the former path the IPU 26 may do little after the initial sending of the memory blocks of the fragments on that path other than monitoring the fragment identifiers along this path sent via the PFFQ 44. Along the latter path, it may attempt to stay a certain distance ahead of the processor, as normal. Eventually when the IPU 26 sees a fragment identifier from the latter path in the PFFQ 44, it terminates the former path.

In the embodiment described above, the IPU 26 is pre-sending memory blocks from the L2 cache 18 to the L1 cache 16. In a similar fashion, other embodiments could pre-send memory blocks from a lower level component of a memory hierarchy to a higher level component of the memory hierarchy where memory blocks may be accessed by the processor 12 in a faster manner. One embodiment may operate to pre-send memory blocks from a L3 cache 19 to an L1 cache 16 via a L2 cache 18. Another embodiment may operate to pre-send memory blocks from a L3 cache 19 directly to an L1 cache 16 bypassing a L2 cache 18. Another embodiment may operate to pre-send memory blocks from a L3 cache 19 to a storage buffer separate from an L1 cache 16 from where it may be accessed advantageously by the processor 12. Another embodiment may operate to pre-send memory blocks from a L2 cache 19 to a micro-operation cache separate from an L1 cache. In other embodiments, memory blocks that are different from memory blocks such as memory blocks that are smaller than or larger than memory blocks may be pre-sent from a lower level of a memory hierarchy to a higher level of the memory hierarchy. More generally, the pre-sending described in this application is not limited to direct transfers of memory blocks (for example from the L2 cache to the L1 cache) but may include indirect transfers of memory blocks using intervening storage structures as part of the desired transfer.

In the embodiment described above, the IPU 26 operated both to create and use the FT 30. In other embodiments the creation of a FT 30 could be done separately from its use for pre-sending memory blocks. In one embodiment, a FT 30 could be constructed in software or by a dynamic compiler. In other embodiments a FT 30 could be constructed with a mix of hardware and software components. Similarly, in one embodiment the operation of the IPU 26 to pre-send memory blocks could be carried out in software running on a separate processor from the processor running the program or on a separate thread running on the same processor.

The inventors contemplate that the pre-sending mechanism described above may also be used for pre-sending information blocks to structures outside of the memory hierarchy as is typically defined including, for example, pre-sending information blocks to branch target buffers (BTBs), instruction translation lookaside buffers (ITLBs) and even branch predictors that may be used by a processor for faster instruction processing. Such structures may have a smaller upper level table for fast access by a processor and a lower level table with larger capacity. Such a system would employ a pre-sending unit communicating with the processor and a lower level table, for example a lower level table of a branch target buffer, to pre-send information from the lower level table to an upper level table, for example the upper level table of a branch target buffer. Such a system would operate during execution of a program by the processor to: (1) maintain a first table linking a first instruction of the program to a first set of information blocks and to a second instruction of the program, the second instruction linked to a second set of information blocks and succeeding the first instruction in an execution of the program; and (2) use the first table to pre-send an information block from a second lower level table to a third upper level table.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

What we claim is:

1. A computer architecture comprising:
   a processor;
   a memory hierarchy providing a lower level component and a higher level component providing faster access by the processor than the lower level component, the lower level component holding a portion of a program in defined memory blocks; and
   an instruction pre-sending unit communicating with the processor and the lower level component and operating during execution of a program by the processor to:
   (1) maintain a table linking a first instruction of the program to a first set of memory blocks and to a second instruction of the program, the second instruction linked to a second set of memory blocks and succeeding the first instruction in an execution of the program;
   (2) maintain a stack to identify the second set of memory blocks linked to the second instruction; and
   (3) use the table in conjunction with the stack to pre-send a memory block from the first set of memory blocks and from the second set of memory blocks from a lower level component of the memory hierarchy to a higher level component of the memory hierarchy.

2. The computer architecture of claim 1 wherein the each memory block in the first set of memory blocks and the each memory block in the second set of memory blocks is a cache block.

3. The computer architecture of claim 1 wherein the first and second sets of memory blocks are defined by corresponding portions of the program delineated by call instructions or return instructions of the program.

4. The computer architecture of claim 1 wherein the table provides a logical graph of the program having sets of memory blocks as nodes linked by directed edges indicating execution order.

5. The computer architecture of claim 1 wherein the table links a given first instruction and first set of memory blocks to two or more second instructions and second sets of memory blocks.

6. The computer architecture of claim 5 wherein the table assigns path aging bits to each of the two or more second instructions and the pre-sending unit operates to pre-send a memory block from a given second set of memory blocks based upon the value of the path aging bits of the second instruction associated with the given second set of memory blocks.

7. The computer architecture of claim 1 wherein at (3), the instruction pre-sending unit determines whether a memory block from a given set of memory blocks is currently in the higher level component and pre-sends the memory block to the higher level component based on that determination.

8. The computer architecture of claim 1 wherein the instruction pre-sending unit further operates during execution of the program by the processor to:
   (4) repeat (3) with the first instruction associated with the first set of memory blocks in a given repetition being the second instruction associated with the second set of memory blocks of the previous repetition with the second set of memory blocks in the given repetition being a new third set of memory blocks.

9. The computer architecture of claim 8 wherein the instruction pre-sending unit performs at least two repetitions without communication with the processor.

10. The computer architecture of claim 8 wherein the instruction pre-sending unit periodically receives from the processor an identifier of proximately executing memory blocks to control the number of repetitions.

11. The computer architecture of claim 8 wherein the instruction pre-sending unit maintains the table by monitoring execution of the program.

12. The computer architecture of claim 1 wherein the first instruction of the program and second instruction of the program in the table are identified by a compressed representation of the program counter values of the first instruction of the program and of the second instruction of the program.

13. The computer architecture of claim 1 wherein the table is set associative.

14. The computer architecture of claim 1 wherein the stack is maintained by pushing information identifying the second set of blocks onto the stack when the second instruction is not a return instruction and by popping information identifying the second set of blocks from the stack when the second instruction is a return instruction.

15. A computer architecture comprising:
   a processor;
   a memory hierarchy providing a lower level component and a higher level component providing faster access by the processor than the lower level component, the lower level component holding a portion of a program in defined memory blocks; and
   an instruction pre-sending unit communicating with the processor and the lower level component and operating during execution of a program by the processor to:
   (1) maintain a table linking a first instruction of the program to a first set of memory blocks and to a second instruction of the program, the second instruction linked to a second set of memory blocks and succeeding the first instruction in an execution of the program;
   (2) use the table to pre-send a memory block from the first set of memory blocks and from the second set of memory blocks from a lower level component of the memory hierarchy to a higher level component of the memory hierarchy;
   wherein the table links a given first instruction and first set of memory blocks to two or more second instructions and second sets of memory blocks; and
   wherein the instruction pre-sending unit operates to pre-send a memory block from each of the corresponding two or more second sets of memory blocks.

16. A method of managing memory blocks in a computer architecture having a processor and a memory hierarchy providing a lower level component and a higher level component providing faster access by the processor than the lower level component, the lower level component holding a portion of a program in defined memory blocks; the method comprising:
(1) maintaining a table linking a first instruction of the program to a first set of memory blocks and to a second instruction of the program, the second instruction linked to a second set of memory blocks and succeeding the first instruction in an execution of the program;
(2) maintain a stack to identify the second set of memory blocks linked to the second instruction; and
(3) using the table in conjunction with the stack to pre-send a memory block from the first set of memory blocks and from the second set of memory blocks from a lower level component of the memory hierarchy to a higher level component of the memory hierarchy.

17. The method of claim 16 wherein each memory block in the first set of memory blocks and each memory block in the second set of memory blocks is a cache block.

18. The method of claim 16 wherein the first and second sets of memory blocks are defined by corresponding portions of the program delineated by call instructions or return instructions of the program.

19. The method of claim 16 wherein the table provides a logical graph of the program having sets of memory blocks as nodes linked by directed edges indicating historical execution order.

20. The method of claim 16 wherein the table links a given first instruction and first set of memory blocks to two or more second instructions and second sets of memory blocks.

21. The method of claim 20 wherein the table assigns path aging bits to each of the two or more second instructions and the pre-sending unit operates to pre-send a memory block from a given second set of memory blocks based upon the value of the path aging bits of the second instruction associated with the given second set of memory blocks.

22. The method of claim 16 wherein at (3), further including determining whether a memory block from a given set of memory blocks is currently in the higher level component and pre-sending the memory block to the higher level component based on that determination.

23. The method of claim 16 further including repeating (3) with the first instruction associated with the first set of memory blocks in a given repetition being the second instruction associated with the second set of memory blocks of the previous repetition with the second set of memory blocks in the given repetition being a new third set of memory blocks.

24. The method of claim 23 including identifying a proximately executing memory block to control the number of repetitions.

25. The computer architecture of claim 16 where in the table is maintained by monitoring the execution of the program.

26. The method of claim 16 wherein the first instruction of the program and the second instruction of the program in the table are identified by a compressed representation of the program counter values of the first instruction of the program and of the second instruction of the program.

27. A method of managing memory blocks in a computer architecture having a processor and a memory hierarchy providing a lower level component and a higher level component providing faster access by the processor than the lower level component, the lower level component holding a portion of a program in defined memory blocks; the method comprising:
(1) maintaining a table linking a first instruction of the program to a first set of memory blocks and to a second instruction of the program, the second instruction linked to a second set of memory blocks and succeeding the first instruction in an execution of the program;
(2) using the table to pre-send a memory block from the first set of memory blocks and from the second set of memory blocks from a lower level component of the memory hierarchy to a higher level component of the memory hierarchy;
wherein the table links a given first instruction and first set of memory blocks to two or more second instructions and second sets of memory blocks; and
further including pre-sending a memory block from each of the corresponding two or more second sets of memory blocks.

* * * * *